United States Patent [19]  [11] 4,203,952
Hancock et al.  [45] May 20, 1980

[54] PROCESS FOR THE REMOVAL OF HEAVY METALS AND TRANSITION METALS OTHER THAN PLATINUM FROM SOLUTION

[75] Inventors: Ronald D. Hancock, Weybridge; Ian V. Howell, Woking, both of England

[73] Assignee: The British Petroleum Company Limited, London, England

[21] Appl. No.: 831,603

[22] Filed: Sep. 8, 1977

Related U.S. Application Data

[63] Continuation-in-part of Ser. No. 575,739, May 8, 1975, abandoned.

[51] Int. Cl.$^2$ .................... B01D 15/00; B01D 15/02
[52] U.S. Cl. .................................... 423/6; 423/22; 423/24; 423/25; 423/89; 423/99; 423/100
[58] Field of Search ............ 423/6, 7, 24, 25, 100, 423/99, 89, 22

[56] References Cited

U.S. PATENT DOCUMENTS

| | | | |
|---|---|---|---|
| 3,745,206 | 7/1973 | Haluska et al. | 423/22 |
| 3,763,049 | 10/1973 | Gerber | 423/7 X |
| 3,847,841 | 11/1974 | Motani et al. | 423/24 X |
| 3,892,688 | 7/1975 | Motani et al. | 423/24 X |
| 3,892,689 | 7/1975 | Motani et al. | 423/24 X |
| 3,904,373 | 9/1975 | Harper | 252/408 |
| 3,957,504 | 5/1976 | Ho et al. | 423/7 X |
| 3,994,719 | 11/1976 | Corte et al. | 423/100 X |

OTHER PUBLICATIONS

Harper, G. B. "Reusable Glass–Bound pH Indicators." Pub. in Anal. Chem. 47(2): 348-351 Feb. 51.

*Primary Examiner*—Richard E. Schafer
*Attorney, Agent, or Firm*—Brooks, Haidt, Haffner & Delahunty

[57] ABSTRACT

A process for the removal of heavy metals uranium and transition metals other than noble transition metals from solution by contacting the solution with the product obtained by reacting an inorganic solid eg. silica gel containing surface hydroxyl groups with a silicon compound of defined formula containing a free thiol group or a free amino group and either an —OR group or a halogen atom under conditions which effect reaction between the hydroxyl group and the —OR group or halogen atom thereby bonding the silicon compound to the inorganic solid.

21 Claims, No Drawings

PROCESS FOR THE REMOVAL OF HEAVY METALS AND TRANSITION METALS OTHER THAN PLATINUM FROM SOLUTION

This application is a continuation-in-part of our parent application Ser. No. 575,739 filed on May 8, 1975, now abandoned.

The present invention relates to the removal of heavy metals and transition metals other than platinum from solution and in particular to the removal of mercury from aqueous solutions and the removal of copper from jet aviation turbine kerosine.

The removal of metals from solutions has in recent times assumed increasing importance from the viewpoint of environmental protection. For example when mercury is employed in processing operations it is necessary owing to its toxic nature to reduce to a minimum the quantities that are discharged to the atmosphere in whatever form, including liquid effluents that are discharged to water courses. This is of particular importance in the manufacture of chlorine and caustic soda by the electrolysis of brine in mercury cathode electrolytic cells where the depleted brine leaving the cells contains a small concentration of mercury, usually between 2 and 10 mg/l, either in the form of elemental mercury or mercury compounds. If this depleted brine is discharged to waste the value of the lost mercury is significant and the receiving water course may be polluted with mercury compounds to an unacceptable level. In the photographic industry it is desirable on economic grounds to remove and recover silver from residues. Lead, too because of its high toxicity, is desirably removed from effluents and from leaded gasoline. Copper is desirably removed from jet aviation turbine kerosine.

The present invention affords a process for removing heavy metals, uranium, and transition metals other than platinum from solution.

Thus according to the present invention there is provided a process for the removal of heavy metals, uranium and transition metals other than platinum from solution which process comprises contacting the solution containing the metal in the form of a soluble compound thereof with a substrate comprising the product obtained by reacting an inorganic solid containing surface hydroxyl groups with a compound of formula (I):

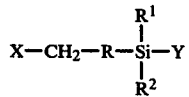
(I)

wherein
Y is an —OR$^3$ group in which R$^3$ represents a H atom or an alkyl, aryl or acyl group containing up to 20 carbon atoms or Y is a halogen atom, X represents an —NR$^4$R$^5$ group in which R$^4$ and R$^5$ is a H atom or an alkyl or aryl group containing up to 20 carbon atoms or a group of formula:

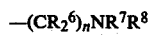

in which R$^6$, R$^7$ and R$^8$ represent a H atom, an alkyl or aryl group containing up to 20 carbon atoms and wherein R$^4$, R$^5$, R$^6$, R$^7$ and R$^8$ may be the same or different and n is an integer between 1 and 10 or X is a saturated or unsaturated cyclic group in which one or more ring positions are occupied by nitrogen atoms or X is the group —SR$^9$ wherein R$^9$ is a hydrogen atom or an alkyl group containing up to 20 carbon atoms, R is a divalent organic group containing up to 20 carbon atoms, R$^1$ and R$^2$ are organic radicals containing up to 20 carbon atoms or halogen atoms under conditions which effect reaction between the group Y— and an —OH group on the surface of the inorganic solid thereby bonding the compound (1) to the inorganic solid.

According to another aspect of the present invention there is provided a process for the removal of uranium, heavy metals and transition metals other than platinum from solution which process comprises contacting the solution containing the metal in the form of a soluble compound thereof with a substrate comprising the product obtained by reacting an inorganic solid containing surface hydroxyl groups with a compound of formula (I):

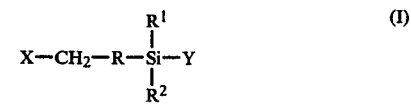

wherein
Y is an —OR$^3$ group in which R$^3$ represents a H atom or an alkyl, aryl or acyl group containing up to 20 carbon atoms or Y is a halogen atom, X represents an —NR$^4$R$^5$ group in which R$^4$ and R$^5$ is a H atom or an alkyl or aryl group containing up to 20 carbon atoms or a group of formula:

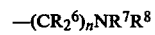

in which R$^6$, R$^7$ and R$^8$ represent a H atom, an alkyl or aryl group containing up to 20 carbon atoms and wherein R$^4$, R$^5$, R$^6$, R$^7$ and R$^8$ may be the same or different and n is an integer between 1 and 10 or X is a saturated or unsaturated cyclic group in which one or more ring positions are occupied by nitrogen atoms or X is the group —SR$^9$ wherein R$^9$ is a hydrogen atom or an alkyl group containing up to 20 carbon atoms, R is a divalent organic group containing up to 20 carbon atoms, R$^1$ and R$^2$ are organic radicals containing up to 20 carbon atoms,
under conditions which effect reaction between the group Y— and an —OH group on the surface of the inorganic solid thereby bonding the compound (1) to the inorganic solid.

The inorganic solid containing surface hydroxyl groups may be alumina, titania, zirconia, glass, sepiolite, or a zeolitic molecular sieve. Preferably the inorganic solid is silica and more preferably silica gel. In addition mixtures of inorganic solids may be used. Unless they have been subjected to severe treatments e.g. heating above 1000° C. all commercial silicas contain surface hydroxyl groups. However for the removal of metals from alkaline media, under which condition silica would be chemically attacked, it is preferred to employ an alkali resistant inorganic solid containing surface hydroxyl groups.

R$^1$ and R$^2$ in the compound of formula (I) may be alkyl, aryl, aryloxy or alkoxy radicals and may be the same or different. Preferably R$^1$ and R$^2$ are halogen atoms, alkoxy or aryloxy groups. Preferably the group Y is an alkoxy group and the groups $R^1$ and $R^2$ and Y are identical alkoxy groups.

R in the compound of formula (I) is suitably an alkylene group containing up to 6 carbon atoms and is preferably a dimethylene group.

Examples of suitable groups X in the compound of formula (I) include —SH, —$SR^9$, —$NH_2$, —$NHR^4$, —$NR^4R^5$, —$NH(CH_2)_2NH_2$, —$NR^4(CH_2)_2NR^7R^8$,

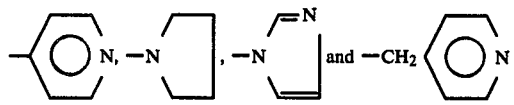

Examples of suitable compounds of formula (I) are $(MeO)_3Si(CH_2)_3SH$, $(MeO)_3Si(CH_2)_3NH(CH_2)_2NH_2$ and

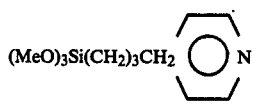

Among the compounds of formula (I) found to be particularly effective in removing metals from solutions are compounds of the formula:

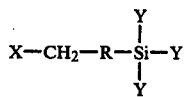
(II)

wherein R is a divalent organic group of up to 20 carbon atoms; Y is the group —$OR_3$ wherein $R_3$ is hydrogen or alkyl or Y is chlorine; and X is —SH, —$NHCH_2CH_2NH_2$, —$NH_2$ or

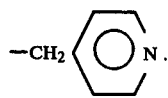

In the case in formula II where X is —SH the metals effectively removed from solution are mercury, silver, lead, copper, cadmium and rhodium. Uranium does not appear to be satisfactorily removed from solution by those compounds wherein X is —SH.

In the case in formula II where X is —$NHCH_2CH_2NH_2$, —$NH_2$, or

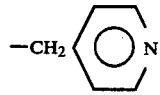

the metals effectively removed from solution are not only mercury, silver, lead, copper, cadmium and rhodium, but also uranium.

In the case of silica and the compound of formula (I) the substrate is believed to be formed by the reaction represented by the following equation:

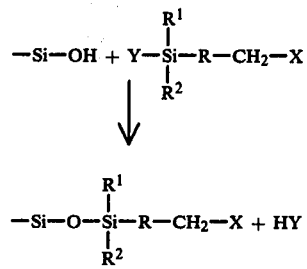

However the invention is not intended to be restricted in any way by the above equation representing the formation of the substrate.

The substrate may be produced by reacting the inorganic solid containing surface hydroxyl groups with the compound of formula (I) in a single stage or in two or more stages. Thus in a single stage the reaction may be effected by warming the two together e.g. under reflux in the presence of an inert solvent for the compound of formula (I) for 1 to 3 hours and thereafter separating the product. A suitable solvent for the compound of formula (I) is toluene. In two stages the substrate may be produced by reacting the inorganic solid containing surface hydroxyl groups with a compound of formula:

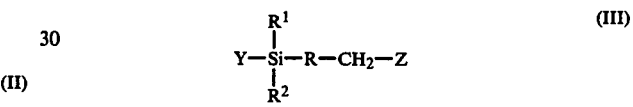
(III)

wherein Y, R, $R^1$ and $R^2$ have the same identity as in formula (I) above and Z is a halogen atom, preferably chlorine, in a first stage and in a second stage reacting the product from the first stage with a compound of formula:

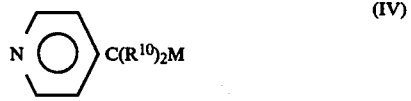
(IV)

wherein $R^{10}$ is a hydrogen atom or an alkyl group containing less than 20 carbon atoms, preferably less than 12 carbon atoms and M is an alkali metal, preferably lithium, and thereafter recovering the product from the second stage. Preferably the compound of formula (III) is $(MeO)_3Si(CH_2)_3Cl$ and the compound of formula (IV) is

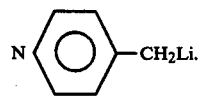

Preferably the product from the first stage is treated to eliminate any remaining unreacted —OH groups on the surface of the inorganic solid by reaction with a silylating agent e.g. a halosilane, such as chloro-trimethyl silane, before reaction in the second stage. The treatment may be effected by refluxing for ½ to 2 hours and distilling off excess chlorotrimethyl silane.

The term heavy metal within the context of the present application is intended to mean those metals in the B sub-groups of Groups I to VI of the Periodic Table according to Mendeleef. The process is particularly applicable to the removal of the heavy metals copper, mercury, silver and lead. Transition metal within the context of this application is defined as a metal which has an incomplete d-shell of electrons in its electronic configuration. The term transition metal may be further sub-divided into nonnoble transition metals e.g. manganese, iron and cobalt and noble transition metals, which are transition metals generally considered to be highly resistant to oxidation. Noble transition metals which are removed from solution by the process of the present invention are ruthenium, rhodium, palladium, osmium and iridium.

The process is particularly suitable for the removal of mercury from aqueous solutions in which it is present as a soluble compound and it is especially suitable for the removal of copper from aviation kerosene such as jet A-1 aviation turbine kerosene. The presence of even small amounts of copper in aviation kerosene is detrimental to the thermal stability of the product and it has been found that copper can be removed therefrom by applicant's process. The process of the invention is particularly applicable to the removal of uranium, heavy metals and transition metals other than platinum in the form of soluble inorganic compounds from aqueous solutions but may also be used for the direct removal of the metals in the form of organic compounds thereof from nonaqueous solutions. Alternatively the process of the invention may be extended to aqueous solutions containing uranium heavy metals and transition metals other than platinum in forms other than soluble inorganic compounds thereof, for instance organic metal compounds or inorganic compounds insoluble in water, or as elemental metals. In such cases, it is necessary to convert the metal to an inorganic compound soluble in water by a suitable pre-treatment. For example, elemental mercury may be oxidised with chlorine and organic compounds of mercury may be treated with nitric acid to convert them to soluble inorganic compounds.

The solution containing the metal in the form of a soluble compound thereof may be contacted with the substrate at any temperature in the range 0° to 100° C. at normal pressures. The substrate is thought to remove the metals by complex compound formation through the donor ligands bonded to the silica surface.

The preferred substrate is the compound formed by reacting silica containing surface hydroxyl groups with a compound of formula (I) wherein X is an —SH group.

The process of the invention is particularly advantageous for use in conjunction with other processes for the removal of heavy metals and transition metals other than platinum from aqueous solution. Thus the process may be used for further reducing the mercury concentration in aqueous solutions after mercury has been removed by the processes described in our British Pat. Nos. 1,368,966 and 1,373,771.

When the substrate loses its activity for removing metals it may either be disposed of without removing the metals or the metals may be removed by means known to those skilled in the art. One such method for removing the metal from the substrate is to contact the metal-loaded substrate with an aqueous solution of a mineral acid followed by separation of the aqueous solution containing the metal from the substrate. Preferably the mineral acid is hydrochloric acid. Thereafter the metal may, if desired, be recovered from the aqueous solution by methods well known in the art.

The solution containing metals may be contacted with the substrate batchwise, or, preferably, continuously by passing the solution over a bed of the substrate mounted in a suitable reactor.

The process of the invention is illustrated by the following Examples:

EXAMPLES

EXAMPLE A

Preparation of silica containing thiol groups 35.2 g silica (Davidson 952) was suspended in toluene and 3.5 ml. of water added. The mixture was stirred at room temperature for 35 minutes and 35 ml. $(MeO)_3SiCH_2CH_2CH_2SH$ in 35 ml. toluene was added. The mixture was stirred at room temperature for 114 hours, the water and most of the solvent distilled off and the silica transferred to a Soxhlet apparatus, where it was extracted with toluene for 24 hours. Finally it was dried in vacuo. On analysis the silica was found to contain 4.1 percent by weight of sulphur.

EXAMPLE B

Preparation of silica containing pyridine groups (a) 35.9 g silica (Davidson 952) was suspended in xylene and 7 ml. water added. The mixture was stirred at room temperature for 15 minutes and 35 ml. $(MeO)_3SiCH_2CH_2CH_2Cl$ in 50 ml. xylene added. The mixture was warmed to reflux for 6 hours and was then allowed to stand overnight. After standing the water and most of the solvent was distilled off. The silica was transferred to a Soxhlet apparatus extracted with toluene for 24 hours and finally dried in vacuo. On analysis the silica contained 5.5% chlorine.

(b) 11 g of the silica prepared as in (a) above was suspended in approximately 100 ml $Me_3SiCl$ and the mixture warmed to reflux for 95 minutes. After standing overnight the excess $Me_3SiCl$ was distilled off and the silica dried in vacuo.

(c) 49.4 g silica treated as in (b) above was suspended in 100 ml. tetrahydrofuran (THF). A solution of

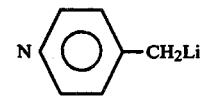

(prepared by reacting phenyl lithium with 15 ml gamma-picoline) in ether/THF was slowly added from a dropping funnel. Initially the red colour was removed from the solution. When the addition was complete the red-brown mixture was stirred at room temperature for 1 hour and at reflux for a further hour. 50 ml. methanol were added to destroy the excess lithiopicoline. The silica was transferred to a Soxhlet apparatus and extracted with methanol for 72 hours. Finally it was dried in vacuo. On analysis the silica was found to contain 0.3 percent N and 2.4 percent Cl.

EXAMPLE C

Preparation of silica containing chelating amine groups 50 g acid washed U30 silica gel (which had been dried at 180° C.) and water (2 ml.) was stirred in toluene (500 ml.) at room temperature for 2 hours. The silane $(MeO)_3Si(CH_2)_3NH(CH_2)_2NH_2$ (12.5 ml.) was added and stirred for 48 hours at room temperature. The product was filtered off, soxhlet extracted with methanol for 16 hours and dried in vacuo. By analysis the silica contained 2.1% N.

EXAMPLE 1

700 ml. of an aqueous solution of mercuric chloride containing 780 ppb mercury was stirred with 1 g of the silica containing thiol groups produced in Example A at room temperature and samples were withdrawn from mercury analysis after various intervals of time. The withdrawal times and mercury analyses are given in Table 1.

EXAMPLE 2

700 ml. of an aqueous solution of mercuric chloride containing 780 ppb mercury was stirred with 1 g of the silica containing pyridine groups product from Example B at room temperature and samples were withdrawn for mercury analysis after various intervals of time. The withdrawal times and mercury analyses are given in Table 1.

EXAMPLE 3

700 ml. of an aqueous solution of mercuric chloride containing 780 ppb mercury was stirred with 1 g of the silica containing chelate amine groups product from Example C at room temperature and samples were withdrawn for mercury analysis after various intervals of time. The withdrawal times and mercury analyses are given in Table 1.

EXAMPLE 6

250 ml of an aqueous solution of $CuCl_2.2H_2O$ containing 590 ppm copper was stirred at room temperature with 4 g of a silica containing thiol groups prepared as in Example A but containing 3.76 percent by weight of sulphur. Samples were withdrawn periodically and analysed for the concentration of copper in solution. The withdrawal times and the silver analyses are given in Table 2.

EXAMPLE 7

250 ml. of an aqueous solution of $CdCl_2.2\frac{1}{2}H_2O$ containing 1,140 ppm cadmium was stirred at room temperature with 4 g of a silica containing thiol groups prepared as in Example A but containing 3.76 percent by weight of sulphur. Samples were withdrawn periodically and analysed for the concentration of cadmium in solution. The withdrawal times and the cadmium analyses are given in Table 2.

TABLE 2

| Example | Metal | ppm of metal in solution after: | | |
|---|---|---|---|---|
| | | 0 min. | 10 min. | 30 min. |
| 4 | Pb | 1,920 | 1,660 | 1,424 |
| 5 | Ag | 1,000 | 320 | 64 |
| 6 | Cu | 590 | 280 | 300 |
| 7 | Cd | 1,140 | 1,100 | 1,100 |

EXAMPLE 8

A solution of 0.21 g of $[Rh(CO)_2Cl]_2$ in 100 ml. heptane was stirred with 4.06 g of a silica containing thiol groups prepared as in Example A but containing 2.93

TABLE 1

Time After Which Sample was Withdrawn (min) — ppb mercury in aqueous sample withdrawn — Example 1, Example 2, Example 3

The procedure was then repeated with a further 12 ml. portion of concentrated hydrochloric acid. The mercury content of the second sample was 148 ppm. This FIGURE corresponds to a recovery of >80 percent of the co-ordinated mercury.

EXAMPLE 11

The regenerated silica containing thiol groups from Example 10 was washed with water until free of hydrochloric acid and 100 ml. of an aqueous solution containing 780 ppb of mercury was passed over the silica at a rate of 40 ml/h. The effluent aqueous solution was collected and by analysis found to have a mercury content of 50 ppb.

This Example shows that silica containing thiol groups retains its capacity for removing mercury from aqueous solutions after regeneration with mineral acid.

EXAMPLE 12

Comparison of Saturation Capacities (a) The saturation capacity of silica containing thiol groups 2.70 g mercuric chloride dissolved in 250 ml. distilled water was vigorously stirred with 5 g of a silica containing thiol groups prepared as described in Example A and containing 2.93 percent by weight of sulphur for 3 hours at room temperature. The silica was then collected, Soxhlet extracted with water until the washings were free of residual mercury (16 hours) and then dried in vacuo. The mercury content of the product was found to be 14.4 percent by weight.

Assuming that the mercury forms a 1:1 complex with all the thiol groups the FIGURE for the mercury content corresponds to approximately 95 percent utilisation of the thiol groups.

(b) Comparison with the saturation capacity of a commercial thiol resin 7.92 g mercuric chloride dissolved in 400 ml distilled water was vigorously stirred with 2.02 g of a commercial resin (an Imac. TMR resin sold by AKZO Chemical) containing thiol groups (23.5 percent weight S), for 5 hours at room temperature. After allowing to stand overnight the resin was isolated from the reaction mixture by filtration, Soxhlet extracted with water for 16 hours, washed with acetone, and then dried in vacuo. The mercury content of the product was found to be 43 percent weight.

Assuming that the mercury forms a 1:1 complex with the thiol groups present this FIGURE for the mercury content corresponds to approximately 60 percent utilisation of the thiol groups.

EXAMPLE D

Reaction of N-aminoethylaminopropyltrimethoxysilane with silica

Acid washed U30 silica (20 g), which had been dried at 180° C., was stirred for 2 hours at room temperature with distilled water (10 ml) and toluene (250 ml). Residual water was distilled from the reaction flask and, after cooling to room temperature, the silane $(MeO)_3$-$SiCH_2CH_2CH_2NHCH_2CH_2NH_2$ (20 ml) was added. The mixture was stirred at reflux temperature for 3 hours during which time any alcohol produced was collected in a Dean & Stark tube which was periodically drained. After cooling, the silica product was transferred to a Soxhlet apparatus and extracted with dry methanol for 24 hours. The silica was finally dried in vacuo. On analysis the silica was found to contain 1.8 percent weight nitrogen.

EXAMPLE E

Reaction of N-aminoethylaminopropyltrimethoxysilane with silica

Acid washed U30 silica (50 g), which had been dried at 180° C., was stirred at room temperature for 2 hours with distilled water (5 ml) and toluene (300 ml). To this mixture was added the silane $(MeO)_3$-$SiCH_2CH_2CH_2NHCH_2CH_2NH_2$ (12.5 ml) and the stirring continued for a further 48 hours. The silica product was transferred to a Soxhlet apparatus and extracted with methanol for 16 hours prior to drying in vacuo. On analysis the silica was found to contain 2.1 percent weight nitrogen.

EXAMPLE F

Reaction of α-aminopropyltrimethoxysilane with silica

Acid washed U30 silica (25 g), which had been dried at 180° C., was stirred at room temperature for 2 hours with distilled water (15 ml) and toluene (300 ml). Residual water was distilled from the reaction flask and, after cooling to room temperature, the silane $(EtO)_3$-$SiCH_2CH_2CH_2NH_2$ (25 ml) was added. The mixture was stirred at reflux for 3 hours during which time any alcohol produced was collected in a Dean & Stark tube which was periodically drained. After cooling, the silica product was transferred to a Soxhlet apparatus and extracted with methanol for 24 hours prior to drying in vacuo. On analysis the silica was found to contain 0.7 percent weight nitrogen.

EXAMPLE 13

200 ml of a dilute sulphuric acid solution of uranyl sulphate containing 1.64 g $UO_2SO_4 3H_2O$ was stirred with 1.62 g of the diamine functionalised silica, prepared as described in Example E, for 5 hours at room temperature. After allowing the mixture to stand overnight the silica product was isolated by filtration and then Soxhlet extracted with water for 18 hours followed by methanol for 8 hours. The silica was finally dried in vacuo. On analysis the silica was found to contain 1.2 percent weight uranium.

EXAMPLE 14

200 ml of a dilute sulphuric acid solution of uranyl sulphate containing 2.19 g $UO_2SO_4 3H_2O$ was stirred with 1.92 g of the primary amine functionalised silica, prepared as described in Example F for 5 hours at room temperature. After allowing the mixture to stand overnight the silica product was transferred to a Soxhlet apparatus and extracted with water for 18 hours then methanol for 8 hours. The silica was finally dried in vacuo. On analysis the silica was found to contain 0.3 percent weight uranium.

EXAMPLE 15

200 ml of a dilute sulphuric acid solution of uranyl sulphate containing 1.29 g $UO_2SO_4 3H_2O$ was stirred with 2.11 g of acid washed U30 silica for 5 hours at room temperature. After allowing the mixture to stand for 18 hours the silica product was isolated by filtration and then Soxhlet extracted with water for 18 hours followed by methanol for 8 hours. The silica was finally dried in vacuo. On analysis the silica was found to contain 0.1 percent weight uranium.

EXAMPLE 16

250 ml of an aqueous solution of uranyl nitrate containing 0.66 g $UO_2(NO_3)_2 6H_2O$ was stirred with 1.58 g of the diamine functionalised silica, prepared as described in Example 1, for 4 hours at room temperature. After allowing the mixture to stand for 65 hours the silica product was isolated by filtration and then Soxhlet extracted with water for 12 hours followed by methanol for 8 hours. The silica was finally dried in vacuo. On analysis the silica was found to contain 5.9 percent weight uranium.

EXAMPLE 17

Extraction of Soluble Copper From Jet A-1 Aviation Turbine Kerosine (a) Thiol-Silica (i) Preparation of silica containing thiol groups 20 g acid washed U30 silica was stirred for 2 hours at room temperature with 10 ml distilled water and 350 ml toluene. Residual water was then distilled from the reaction flask and, after cooling to ambient temperature, 20 ml of the silane $(MeO)_3SiCH_2CH_2CH_2SH$ was added. The mixture was stirred at reflux for 3 hours. During this time any alcohol produced was collected in a Dean and Stark tube, which was periodically drained. After cooling, the silica product was transferred to a Soxhlet apparatus and extracted with dry methanol for 24 hours. The product was finally dried in vacuo. On analysis the silica contained 1.3 percent weight sulphur.

(ii) Extraction of soluble copper from Jet A-1 aviation turbine kerosine

A concentrated solution of Jet A-1 aviation turbine kerosine, containing 90 ppb by weight soluble copper, was passed through a fixed bed of thiol silica (2 ml), prepared as described above, at room temperature. The liquid flow rate was approximately 20 ml/hour. Samples of the eluate were collected and analysed for copper. The results are shown in Table 1 below:

TABLE 1

| Hours on Stream | ppb Copper in Product |
|---|---|
| 1–2 | <20 |
| 3–4 | <20 |
| 6–7 | <20 |

(b) Diamino-Silica (i) Preparation of silica containing diamino groups 20 g acid washed U30 silica was stirred for 2 hours at room temperature with 10 ml distilled water and 250 ml toluene. Residual water was then distilled out of the reaction flask and, after cooling to room temperature, 20 ml of the silane $(MeO)_3SiCH_2CH_2CH_2NHCH_2CH_2NH_2$ was added. The mixture was stirred and refluxed for 3 hours during which time any alcohol produced was collected in a Dean and Stark tube, which was periodically drained. After cooling, the silica was transferred to a Soxhlet apparatus and extracted with dry methanol for 24 hours. The silica was finally dried in vacuo. On analysis the silica contained 1.8 percent weight nitrogen.

(ii) Extraction of soluble copper from Jet A-1 aviation turbine kerosine

A concentrated solution of Jet A-1 aviation turbine kerosine containing 100 ppb by weight soluble copper, was passed through a 2 ml fixed bed of the diaminosilica (prepared as described above) at room temperature. The liquid flow-rate was approximately 20 ml/hour. Samples of the eluate were collected and analysed for copper. The results are shown in Table 2 below:

TABLE 2

| Hours on Stream | ppb Copper in Product |
|---|---|
| 1–2 | <20 |
| 3–4 | <20 |
| 4–5 | <20 |
| 6–7 | <20 |

What is claimed is:

1. A process for purifying liquids containing mercury, silver, lead, copper, cadmium, rhodium or uranium metal residue which comprises removing such a metal by contacting a liquid solution containing such a metal in the form of a soluble compound thereof with a substrate obtained by reacting an inorganic solid contacting surface hydroxyl groups with a compound of the formula $$X-CH_2-R-\underset{\underset{Y}{|}}{\overset{\overset{Y}{|}}{Si}}-Y$$

wherein R is a divalent organic group of up to 20 carbon atoms; Y is the same and is the group $-OR_3$ where $R_3$ is hydrogen or an alkyl group; or Y is chlorine; and X is $-SH$, $-NHCH_2CH_2NH_2$, $-NH_2$, or

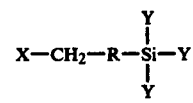

2. A process as defined in claim 1 wherein said reaction between the substrate and the inorganic solid is carried out at an elevated temperature.

3. A process as defined in claim 1 wherein said inorganic solid is at least one of silica, alumina, titania, cepiolite or zeolitic molecular sieves.

4. A process as defined in claim 1 wherein R in said formula is an alkylene group containing up to 6 carbon atoms.

5. A process as defined in claim 1 wherein R in said formula is a dimethylene group.

6. A process as defined in claim 1 wherein the substrate is formed in a single stage by warming said inorganic solid with said compound of the formula in the presence of an inert solvent for said compound of the formula for a period of 1 to 3 hours and thereafter separating said substrate.

7. A process as defined in claim 1 wherein the substrate is formed in at least two stages.

8. A process as defined in claim 1 wherein the metal removed is copper and the solvent contacted is aviation kerosine.

9. A process as defined in claim 1 wherein in said compound of the formula X is $-NHCH_2CH_2NH_2$, $-NH_2$, or

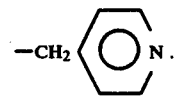

10. A process as defined in claim 9, wherein in said compound of the formula Y is the group —OR$_3$.

11. A process as defined in claim 9 wherein the metal removed is copper and the solvent contacted is aviation kerosine.

12. A process as defined in claim 1 wherein the metal removed is at least one of mercury, silver, lead, copper, cadmium, or rhodium, and wherein in the compound of the formula X is —SH.

13. A process as defined in claim 12 wherein in said compound of the formula Y is the group —OR$_3$.

14. A process as defined in claim 12 wherein the metal removed is copper and the solvent contacted is aviation kerosine.

15. A process as defined in claim 12 wherein the compound of the formula is (CH$_3$O)$_3$Si(CH$_2$)$_3$SH.

16. A process as defined in claim 1 wherein said solution is contacted with said substrate at a temperature in the range of 0° to 100° C. at normal pressures.

17. A process as defined in claim 1 wherein said metal is removed from said substrate by contacting the metal-loaded substrate with an aqueous solution of a mineral acid followed by separation of said aqueous solution containing said metal from said substrate.

18. A process as defined in claim 1 wherein the compound of the formula is (CH$_3$O)$_3$Si(CH$_2$)$_3$NH(CH$_2$)$_2$NH$_2$.

19. A process as defined in claim 1 wherein the compound of the formula is

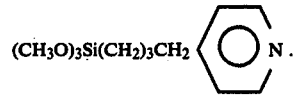

20. A process as defined in claim 1 wherein the compound of the formula is (C$_2$H$_5$O)$_3$Si(CH$_2$)$_3$NH$_2$.

21. A process as defined in claim 1 wherein said solution is contacted with said substrate at room temperature.

UNITED STATES PATENT AND TRADEMARK OFFICE
CERTIFICATE OF CORRECTION

PATENT NO. : 4,203,952

DATED : May 20, 1980

INVENTOR(S) : RONALD D. HANCOCK and IAN V. HOWELL

It is certified that error appears in the above-identified patent and that said Letters Patent are hereby corrected as shown below:

Title page, first column, insert the following:

--[30]       Foreign Application Priority Data

May 28, 1974 [GB]      United Kingdom......23585/74 --

Col. 12, claim 1, line 18, delete "contacting" and insert --containing-- in lieu thereof.

Signed and Sealed this

Twenty-fourth Day of November 1981

[SEAL]

Attest:

GERALD J. MOSSINGHOFF

Attesting Officer    Commissioner of Patents and Trademarks